UNITED STATES PATENT OFFICE.

JOSEPH W. HOLMES, OF WHEATVILLE, NEW YORK.

IMPROVEMENT IN SUN-DIALS.

Specification forming part of Letters Patent No. 205,485, dated July 2, 1878; application filed December 18, 1876.

*To all whom it may concern:*

Figure 1:
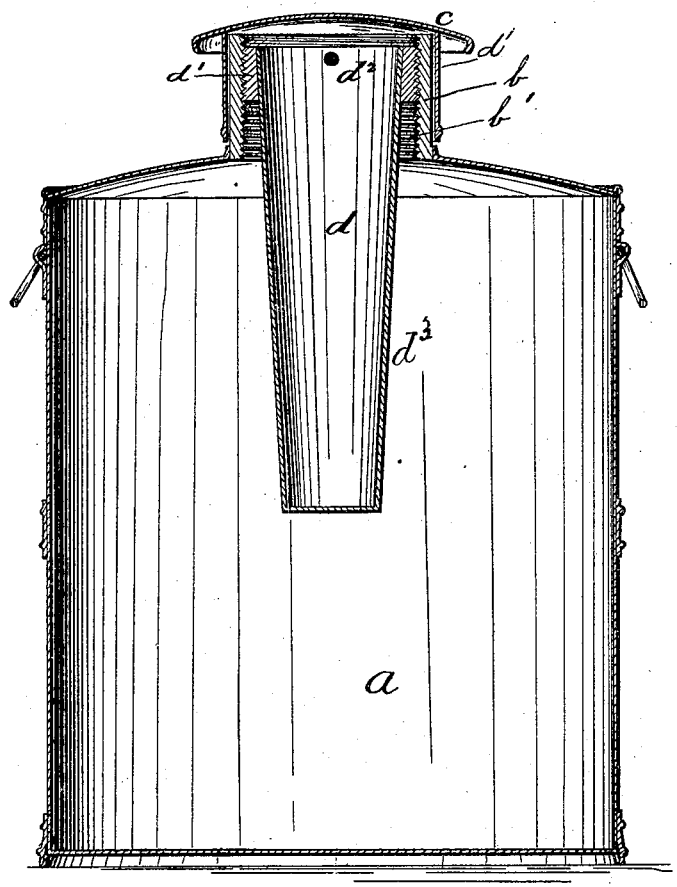
Figure 2:
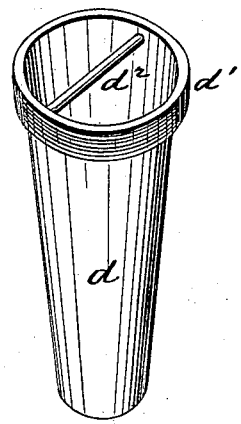

Be it known that I, JOSEPH W. HOLMES, of Wheatville, in the county of Genesee and State of New York, have invented a new and Improved Adjustable Sun-Dial or Solar Chronometer, of which the following is a specification:

Figure 1 is a side elevation, in part section. Fig. 2 is a front elevation. Fig. 3 is a detail view of the sighting device. Fig. 4 is a side elevation, showing the detachable sights, the levels, and the arc as a segment greater than a semicircle.

Similar letters of reference indicate corresponding parts.

My invention relates to apparatus for accurately determining the solar time in any latitude or longitude, the true meridian, the sun's declination, and the latitude of any place; and consists in a quadrant or segment of a circle graduated to degrees and subdivisions thereof, mounted on a horizontal axis; and in a graduated circle fixed upon the quadrant or segment and at right angles to its plane; and in a graduated circle pivoted on one of the arms of the quadrant or the axis of the quadrant or segment, and parallel with the fixed circle; and also in a graduated arc mounted on the face of the pivoted circle, and provided with a traversing arm having a vernier and apertures for casting the sun's image, for surveying or other purposes.

Referring to the drawing, A is the base, upon which the standards B are mounted. C is a graduated quadrant or segment, pivoted at *a* in the upper ends of the standards B B, and whose arc slides between the standards in contact with the vernier D, which is attached to one of the standards, which is arranged to read smaller subdivisions of the arc C than its graduations.

E is a circle mounted on a pivot, *b*, journaled in the arm *c* of the quadrant or segment C, and which pivot or axis may pass through the axis of the quadrant or segment C.

F is a fixed circle, that is rigidly attached to the quadrant or segment C, upon which or within which the circle E revolves, and is graduated on its face or periphery to degrees and subdivisions thereof, and also to hours and fractions thereof; and the movable circle E is provided with a vernier for reading the smaller subdivisions of the circle F.

G is a graduated arc, projecting from the face of the circle E perpendicular to the plane of the circle E. H is an arm pivoted at *d*, traversing the arc G, and is provided with a vernier and projecting arms *h h'*, that extend at right angles from the surface of the arm, and are provided with apertures *g g'*, or lenses *g g'*, for forming the image of the sun on the opposite projections at *i i'*. Slots *l l'* are cut a small distance each way from the apertures *g g'* in a direction perpendicular to the face of the circle E; or the apertures *k k'* may be used for the purpose of bringing into alignment a star or other heavenly body, and for the purpose of laying off angles or taking the bearings of objects. *k k'* are apertures at equal distances from the plane of the circles E F when the arm H is placed at zero on the arc G, and may be used in taking angles of elevation or depression. *n n'* are detachable sights upon the projections *h h'*. *o o'* are levels for the purpose of bringing the base A parallel with the plane of the horizon, or the circles E and F parallel with said plane, when the ninety-degree mark of the circle C is clamped at the zero of the vernier D, when it is desired to use the instrument for the purpose of laying off horizontal angles or taking bearings.

The arc G or the aperture *g* should be turned toward the sun or other heavenly body when its declination is north, and the aperture *g'* when south.

I is a clamping-screw that passes through the arm H, and also through the slot *m* in the arc G, and is capable of clamping the arm H in any desired position.

The arm H is also provided with an aperture, through which the graduations of the arc G are seen and read by a vernier on the arm H.

A binding-screw (not shown in drawing) clamps the arc C to any desired reading. *i i'* are small spots or checks embracing the sun's image, across which fine lines are drawn at right angles with the sun's path, for the purpose of determining more exactly the time of passage of the sun's center.

The manner of using the instrument is as follows: To ascertain the true solar time, level the base A; clamp the arc C to the gradua-

J. J. JOHNSON.
Refrigerating Plugs for Cans.

No. 205,486. Patented July 2, 1878.

WITNESSES
Saml R Turner
C M Sites

INVENTOR
James J. Johnson
By R.S. & N. Lacey
ATTORNEYS

UNITED STATES PATENT OFFICE.

JAMES J. JOHNSON, OF EAST LIVERPOOL, OHIO.

IMPROVEMENT IN REFRIGERATING-PLUGS FOR CANS.

Specification forming part of Letters Patent No. 205,486, dated July 2, 1878; application filed February 8, 1878.

*To all whom it may concern:*

Be it known that I, JAMES J. JOHNSON, of East Liverpool, in the county of Columbiana and State of Ohio, have invented certain new and useful Improvements in Plugs for Vessels for Holding Fluids; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention has for its object to furnish for vessels designed for holding fluids a plug which, when inserted in the vessel, will so compress the fluid that the latter will completely fill the vessel, and thereby be free from agitation while being carried or otherwise shaken; and it consists in a tapering plug provided with a threaded collar adapted to be screwed into the nozzle of the can or other vessel; and it consists, further, in having the plug made hollow, for holding ice or other substances, as will be hereinafter fully explained.

In the drawings, Figure 1 shows a vertical section of a can, bottle, or other vessel with the plug inserted therein; and Fig. 2 shows the plug.

$a$ is the can, bottle, or other vessel for holding the fluid. $b$ is the nozzle, on the inner side of which is formed a thread, $b'$, extending down its entire length, as shown. $c$ is a cap, which slips over the nozzle.

$d$ is an inverted cone-shaped hollow plug, around and flush with the upper end of which is placed a rim or collar, $d^1$, on which is formed a thread adapted to be turned into and held by the thread $b'$ in the nozzle $b$. The lower end $d^3$ extends downward into the vessel, as shown, and by its gradually-increasing diameter from the lower to the upper end it provides a means whereby the proper adjustment of the fluid is more perfectly regulated than can possibly be done by devices of ordinary construction. When the plug is placed in the vessel its rim will be held firmly by the thread $b'$, with capability of being raised or lowered at pleasure, for purposes hereinafter described.

It will also be held firmly in position, so that any tipping to one side or overturning of the vessel will not disturb or move it, thus admirably adapting it for use in the ordinary milk-can or other vessels which have to be transported in wagons over rough roads.

I make this plug hollow, as shown, so as to adapt it to hold ice for cooling the fluid in the can or bottle, and I provide a small cross-bar or handle, $d^2$, or other suitable device, whereby it may readily be turned or lifted.

When fluids are placed in the can it is difficult to so perfectly fill the entire inner space as to prevent all agitation in carrying or otherwise shaking the vessel. In this device the can is filled, as usual, nearly full. The plug is then inserted. The increasing size of the plug forces the fluid into the unoccupied space, and so completely fills the can that all agitation is prevented.

If, when the collar $d^1$ is brought flush with the nozzle $b$, the fluid does not completely fill the vessel, the plug may be turned down, if necessary, till the under edge of the collar is flush with the bottom or lower end of the nozzle, and thereby the larger upper end of the plug will cause the fluid to fill up the vacant space.

I am aware that rectangular devices designed to be let down into tanks transported on cars, for the purposes of inserting ice and controlling the movements of the fluid, have been used, and I do not claim, broadly, such devices; but, Having described my invention, what I claim, and desire to secure by Letters Patent, is—

The inverted vertically-adjustable cone-shaped plug $d$, provided with a rim or collar, $d^1$, and handle $d^2$, and held within and by the nozzle $b$ of the vessel $a$, substantially as and for the purposes set forth.

In testimony that I claim the foregoing as my own I affix my signature in presence of two witnesses.

JAS. J. JOHNSON.

Witnesses:
SOL. J. FAULK,
W. L. TAFT.